US011367189B2

(12) United States Patent
Clymer et al.

(10) Patent No.: US 11,367,189 B2
(45) Date of Patent: Jun. 21, 2022

(54) METHOD FOR OBJECT DETECTION USING HIERARCHICAL DEEP LEARNING

(71) Applicant: Carnegie Mellon University, Pittsburgh, PA (US)

(72) Inventors: Daniel Clymer, Pittsburgh, PA (US); Jonathan Cagan, Pittsburgh, PA (US); Philip LeDuc, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 22 days.

(21) Appl. No.: 17/073,041

(22) Filed: Oct. 16, 2020

(65) Prior Publication Data

US 2021/0406602 A1 Dec. 30, 2021

Related U.S. Application Data

(60) Provisional application No. 62/973,697, filed on Oct. 18, 2019.

(51) Int. Cl.
*G06T 7/00* (2017.01)
*G06K 9/62* (2022.01)
*G06V 20/69* (2022.01)

(52) U.S. Cl.
CPC .......... *G06T 7/0012* (2013.01); *G06K 9/6247* (2013.01); *G06K 9/6257* (2013.01); *G06K 9/6268* (2013.01); *G06K 9/6277* (2013.01); *G06K 9/6298* (2013.01); *G06V 20/695* (2022.01); *G06V 20/698* (2022.01); *G06T 2207/10056* (2013.01); *G06T 2207/20021* (2013.01); *G06T 2207/20081* (2013.01); *G06T 2207/30101* (2013.01); *G06V 2201/031* (2022.01)

(58) Field of Classification Search
None
See application file for complete search history.

(56) References Cited

U.S. PATENT DOCUMENTS

| 2011/0081056 | A1  | 4/2011  | Salafia |
|---|---|---|---|
| 2015/0109202 | A1* | 4/2015  | Ataee .................... G06F 3/014 345/156 |
| 2018/0204111 | A1* | 7/2018  | Zadeh .................. G06N 3/0436 |
| 2019/0034734 | A1* | 1/2019  | Yen ........................ G06T 7/246 |
| 2021/0174958 | A1* | 6/2021  | Drake .................... G06N 20/20 |
| 2021/0327061 | A1* | 10/2021 | Clymer ................ G06K 9/6268 |

OTHER PUBLICATIONS

Wen S, Liu W, Yang Y, Zhou P, Guo Z, Yan Z, Chen Y, Huang T. Multilabel image classification via feature/label co-projection. IEEE Transactions on Systems, Man, and Cybernetics: Systems. Feb. 6, 2020. (Year: 2020).*

* cited by examiner

*Primary Examiner* — Emily C Terrell
*Assistant Examiner* — Nathan J Bloom
(74) *Attorney, Agent, or Firm* — KDB Firm PLLC (57) ABSTRACT

A hierarchical deep-learning object detection framework provides a method for identifying objects of interest in high-resolution, high pixel count images, wherein the objects of interest comprise a relatively a small pixel count when compared to the overall image. The method uses first deep-learning model to analyze the high pixel count images, in whole or as a patchwork, at a lower resolution to identify objects, and a second deep-learning model to analyze the objects at a higher resolution to classify the objects.

17 Claims, 10 Drawing Sheets

FIG. 10

METHOD FOR OBJECT DETECTION USING HIERARCHICAL DEEP LEARNING

RELATED APPLICATIONS

This application claims the benefit of U.S. Provisional Patent Application Ser. No. 62/973,697, filed Oct. 18, 2019, the contents of which are incorporated herein in their entirety.

GOVERNMENT RIGHTS

This invention was made with government support under contract N00014-17-1-2566, issued by the Office of Naval Research. The government has certain rights in this invention.

BACKGROUND OF THE INVENTION

Rendering a microscopic anatomic pathology diagnosis involves either inspecting stained tissue sections of specimens on a glass slide under a microscope or viewing a digitized version of the slide on a computer monitor. This inspection is a complicated process requiring a highly trained pathologist. It is also time consuming, not only because of the relative complexity of the histopathology but because of the need to screen all the tissue on the slides at a microscopic level.

Commercial technology is currently available to digitize pathology glass slides using whole slide scanners. Acquisition of such whole slide images (WSIs) generates digital slides that are typically having a pixel count on the scale of gigapixels. WSIs offer numerous applications not possible with glass slides alone, such as the ability to employ artificial intelligence to triage, screen, and provide diagnostic assistance.

Recent advances have been made in the field of machine learning (ML) for histopathologic imaging. Deep learning has been used effectively in applications such as cancer tumor detection and segmentation. The most common type of task for ML in digital pathology is computer-assisted diagnosis, a supervised learning task that attempts to assist the pathologist in the diagnostic process of labeling a WSI within some category of disease.

Because of the large size of WSIs, typical ML pipelines sample smaller selected regions from the WSI, performing analysis on each region, and then employ some method of aggregating the predictions generated. Often, each one of these regions, called image patches, ranges from 128×128 to 512×512 pixels in size to be computationally tractable.

Because a typical WSI will have thousands of patches, even highly accurate classification algorithms will have many false positives per image. Some of the most successful implementations of ML to automate diagnosis using digital pathology images have come from applications where relevant features exist in many patches across the image, which can be aggregated to minimize the impact of false predictions on a small number of patches.

For example, in problems such as cancer severity classification most successful teams made a global disease probability estimation based on the list of patch-level probabilities from the entire image. In the field of placental histopathology, some work has made use of deep learning, although overall the use of deep learning for noncancer histopathologic image analysis has remained limited, partially because of the limited availability of large data sets.

Microscopic analysis of the human placenta has been advocated in certain clinical settings to determine the anatomic basis of pregnancy-related complications. When correlated with clinical findings, the results of a placental examination may provide actionable information to optimize treatment of both the mother and newborn. This is particularly important when an adverse pregnancy outcome occurs, and in these cases, a major role of the placental examination is to provide supporting histopathologic evidence of the disease process. For example, preeclampsia is a major pregnancy complication characterized by new-onset maternal hypertension and is associated with many serious acute and chronic adverse consequences for both the mother and the newborn.

Preeclampsia affects 2% to 8% of pregnancies and is the leading cause of preterm birth and consequent neonatal morbidity in the developed world. There are many known patterns of chorionic villous morphology, vasculature, and lesions that pathologists look for related to preeclampsia. In particular, the presence of a placental lesion called decidual vasculopathy (DV) is often found in cases of preeclampsia, and when detected in an uncomplicated pregnancy, it has been correlated to the occurrence of preeclampsia and other adverse outcomes in subsequent pregnancies. Microscopic detection of DV, often characterized by hypertrophy of decidual arterioles, is vital for providing physicians with the information they need to move forward with treatment of the mother and newborn, especially with recent research showing that regular doses of aspirin during the first trimester can help to prevent preeclampsia in women who are determined to be at risk for the disease.

In most hospitals, there are often so many deliveries being performed that there are not enough resources to examine every placenta microscopically. Furthermore, not all features may be reliably detected by general pathologists, which justifies the need to employ perinatal pathologists to examine these placentas. Most placentas from uncomplicated pregnancies are typically discarded, with no microscopic inspection being performed. There has been recent research working toward partial automation of some of these analyses, including the use of image processing, such as texture analysis or morphometry, to perform tasks such as vessel detection or villi counting.

SUMMARY OF THE INVENTION

One objective of the invention described herein is to provide a microscopic placental analysis service to most mothers and infants who do not currently have access to this service, through both the automated detection and diagnosis of DV lesions, allowing many more placentas to be efficiently inspected in a more standardized manner and enabling diagnoses that could save lives during future pregnancies and lower health care costs. From an image analysis perspective, the DV lesion is minute compared with the size of a WSI and requires viewing the image at high resolution to accurately detect and diagnose. Moreover, the focal occurrence of even one DV lesion in a placental image containing numerous unaffected vascular segments could be indicative of possible future health problems, meaning that any practical implementation of an automated placental lesion detection algorithm requires stringent levels of both sensitivity and specificity.

This invention is able to minimize false positives from a WSI placental analysis while maintaining a high level of diagnostic accuracy using a multiresolution, deep learning framework in which high-resolution regions for classification are informed by a broader low-resolution examination for regions of interest.

In addition, the invention includes aggregating local patch estimations from the latent space, or the learned hidden feature representation, of the classification framework. These aggregated features are combined with patient metadata for the purpose of learning a global classification of disease for each patient, which can inform the pathologist about which WSIs should be analyzed in more detail.

This method can help achieve effective results when training with comparatively small data sets, as are often found in biomedical applications as well as the current work. The presented method is designed to be used as a low-cost early microscopic detection method for predicting which mothers are most at risk of developing preeclampsia in future pregnancies and can be treated to prevent this from occurring.

The hierarchical deep learning framework designed to find and diagnose small blood vessel lesions in very large histopathological images of a post-birth placenta may be generalized for the more widespread capability of analyzing very high-resolution imagery in a hierarchical manner to improve classification for imbalanced datasets.

The viability of the developed framework may be used for object detection and/or classification problems from other domains, for example, landmark detection in high-resolution satellite imagery. This application is important in a number of fields, including military, housing and infrastructure planning, and crop management, among others.

Similar to the histopathological image analysis discussed above, one of the major difficulties with implementing object recognition within high-resolution aerial images is that the size of the detected objects, much like individual blood vessels in a placenta, are very small compared to the relative size of the captured image. Thus, a method that can reduce the number false classifications in images that primarily consist of "background" regions is highly desired.

The present invention is capable of mitigating these challenges through the implementation of the hierarchical deep learning image analysis framework, thereby achieving excellent results in the detection and classification of objects from 10 classes within aerial satellite images.

DETAILED DESCRIPTION

Figure 1:
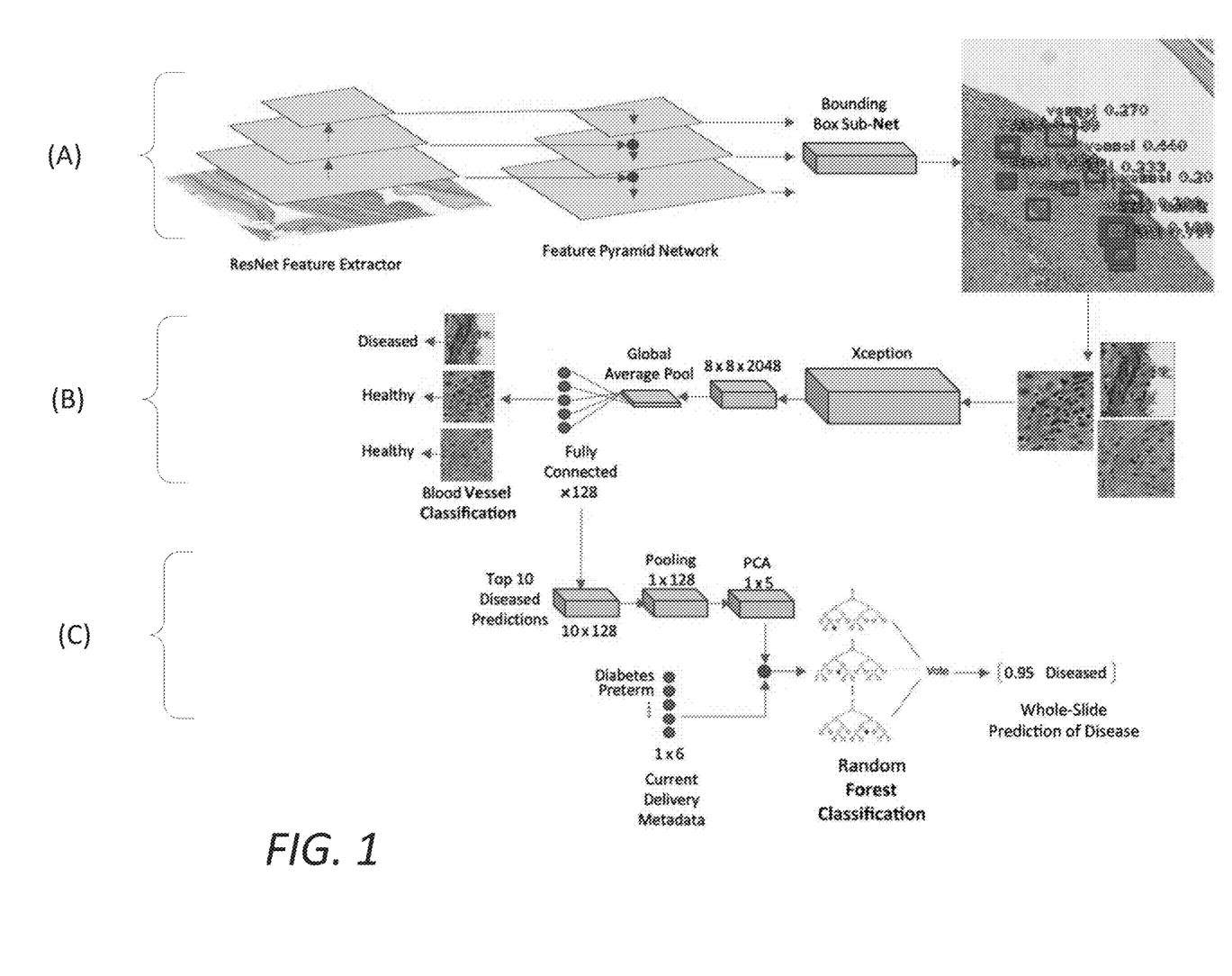
FIG. 1 is a graphical representation of the hierarchical deep learning framework of the present invention, which may be used for whole slide placental image analysis of blood vessel lesions.

As will be explained with reference to FIG. 1, the overall hierarchical deep-learning framework has three stages: object detection, classification, and aggregation. FIG. 1(A) is an object detection framework trained to detect blood vessels at a low resolution within a whole slide image. FIG. 1(B) is a classification framework that analyzes and detects disease inside a high-resolution patch of each blood vessel, and FIG. 1(C) aggregates the latent space vectors of these patch-wise predictions, along with patient delivery metadata, for the prediction of disease at the patient level.

The invention will be explained in terms of an application for examining high-resolution images of placentas for diseased blood vessels, but, as would be realized by one of skill in the art, the invention may be generalized for other purposes. In alternate embodiments, the framework may be applied to detect and classify any structure in any organic tissue. In yet other embodiments, the invention has applicability for the detection of small objects in any high-resolution imagery, for example satellite imagery. The overall process is built with two separately trained neural networks as well as a final aggregation step.

Object Detection

Figure 2:
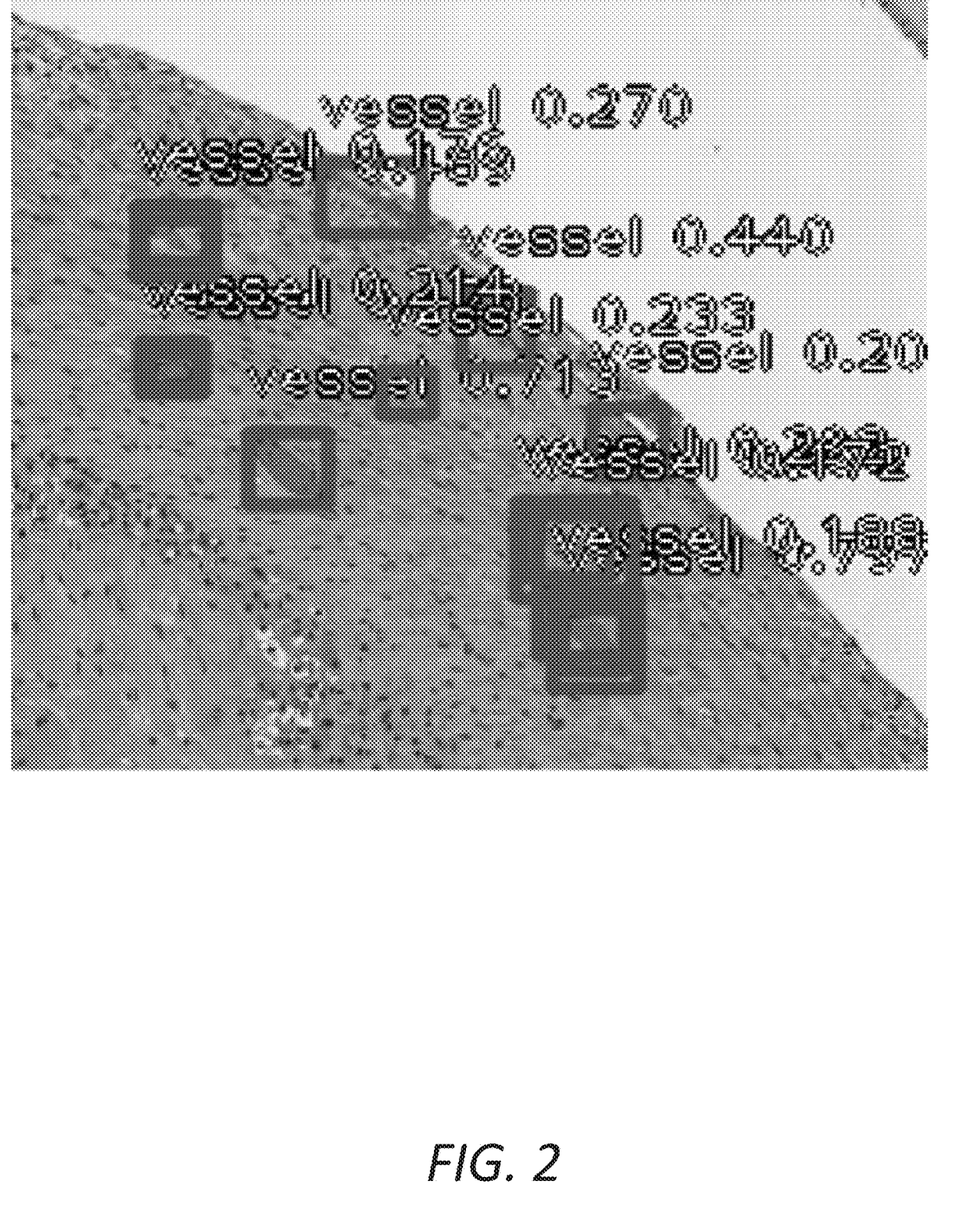
FIG. 2 is an image showing the output from the object detection stage of the hierarchical deep learning framework, as used for blood vessel detection, showing bounding boxes being drawn around each blood vessel in the image patch, along with prediction outputs from the algorithm for each detection.

The object detection stage is shown in high-level form in FIG. 1(A). The purpose of this stage of the framework is to localize objects in the high pixel count images. In the case of the exemplary application, identifying blood vessels in WSIs. The high pixel count images are analyzed at a low resolution, and the localizations, identified by bounding boxes, as shown in FIG. 2, are fed into the next stage of the hierarchical deep learning framework for classification. The numbers accompanying the bounding boxes are prediction outputs from the algorithm for each detection.

In the object detection stage, a high pixel count image, in this case, a WSI, is fed into the framework, split into a grid of smaller patches, and each pass is analyzed to detect blood vessels. The output of object detection stage is a list of bounding boxes with expected probabilities for each patch. From each bounding box location, a higher-resolution patch is taken and used in a classification stage.

To accomplish this, a localization framework is used. In preferred embodiments of the invention, RetinaNet, published by Facebook®, is used. In other embodiments, other localization frameworks may be substituted. This framework utilizes focal loss for training, which reduces the influence of well-classified background examples on the weight updates during training, and has been shown to be effective for object detection frameworks, particularly in cases where the number of background pixels vastly outweighs the pixels occupied by objects during training.

The algorithm uses a ResNet backbone as the feature extractor for the framework, which uses residual learning to alleviate the vanishing gradient problem when training deep networks. The entire framework was initialized with network weights pretrained on the Common Objects in Context (MS-COCO) data set.

All layers of the network were then fine-tuned through training on a WSI data set. For training, each WSI is split into a grid of 256×256 pixel patches at four times resolution, with a 10% overlap between patches to help account for blood vessels that would be split between patches. Because this overlap sometimes causes the algorithm to detect the same blood vessel on two different patches, non-maximum suppression is used to only keep the most confident among overlapping outputs before feeding into the next stage of the ML framework, to avoid having duplicate predictions on the same blood vessel.

As a preprocessing step, slide patches that contained bubble artifacts were excluded from analysis because of the changes these bubbles cause in imaging features.

Patches with folds that went through an annotated blood vessel were also removed because these could potentially affect the analysis. This patch generation will typically result in around 50 to 100 patches per WSI. During training, the images were augmented with random flips, rotations, and translations to increase the volume of the training data. In addition, a method for stain normalization was used, which maps the individual stain contributions in an RGB (red, green, blue) image through an optical density transformation. The network was trained for 75 epochs, with a learning rate of $1\times10^{-5}$ and a batch size of 1.

Figure 3:
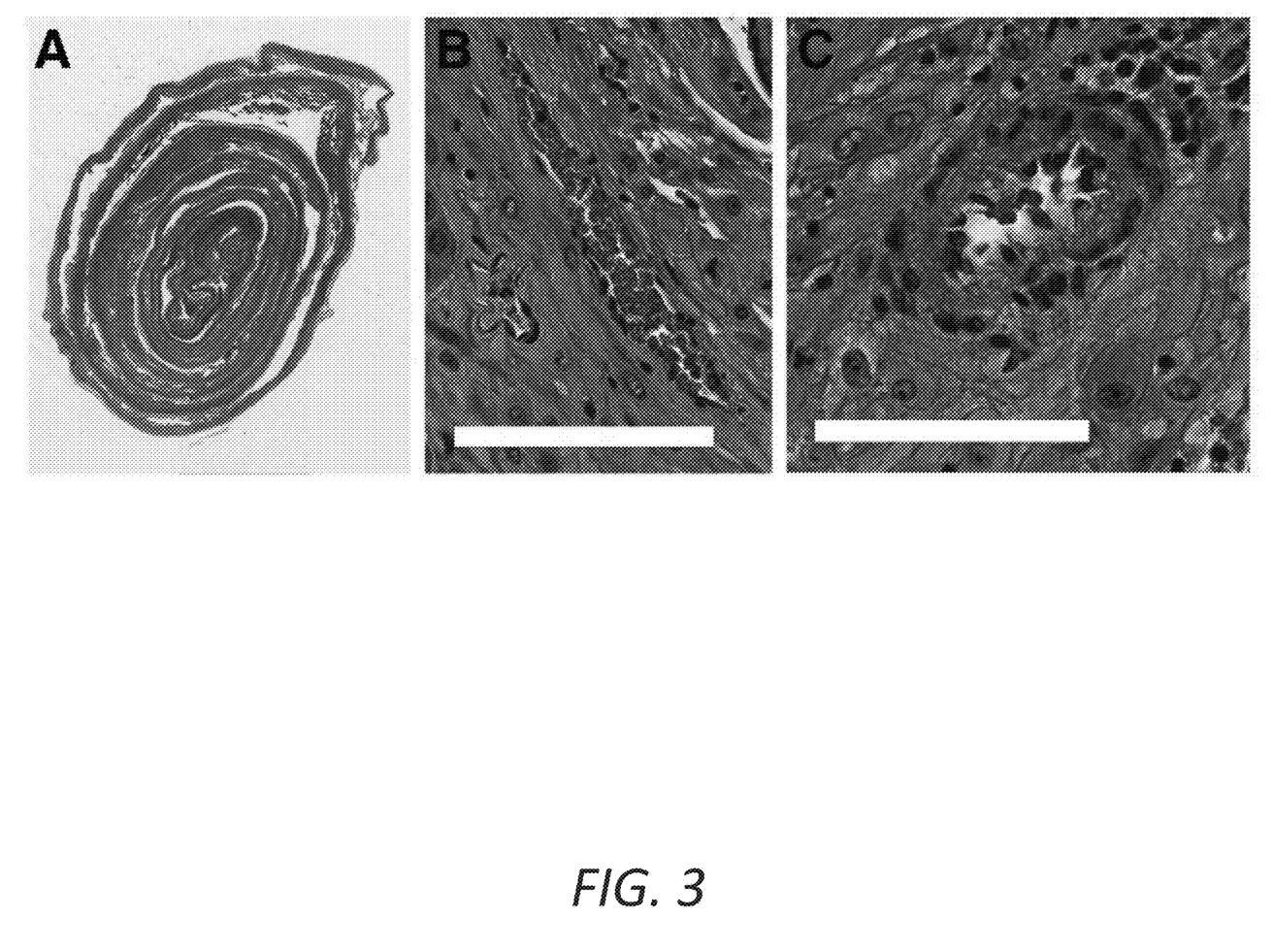
FIG. 3 is a graphical representation of the aggregation stage of the hierarchical deep learning framework, which aggregates latent feature representations from numerous blood vessels in one image.

FIG. 3 shows example image and blood vessel patches from the data set. FIG. 3(A) is a digitized whole slide image of a placental membrane roll at low magnification with hematoxylin and eosin (H&E) stain. To illustrate relative scale, the blue square indicates a single blood vessel. FIG. 3(B) shows an image patch containing an example of a healthy blood vessel at high magnification, with H&E stain. FIG. 3(C) shows an image patch showing a decidual arteriole affected by early-stage decidual vasculopathy, characterized by smooth hypertrophic muscle around the blood vessel lumen at high magnification, with H&E stain.

Classification

The classification stage of the hierarchical deep learning framework ("the framework") is shown in FIG. 1(B). For purposes of the exemplary application, the classification stage outputs a binary classification for each blood vessel as being either diseased (i.e., with DV) or healthy.

To feed an image into this network, an image patch is taken around each localized blood vessel at 10× resolution with 20 pixels of padding added around each side of the blood vessel. In preferred embodiments, the resolution is approximately 2.5 times higher than the previous stage.

Because blood vessels can exhibit a range of shapes and sizes, each image is rescaled to be square, and then, in the preferred embodiment, is resampled to 299×299 pixels before feeding into the network.

The classification stage of the hierarchical deep learning framework utilizes a convolutional neural network backbone. In preferred embodiments, the Xception convolutional neural network architecture is used, which uses depth-wise separable convolutions to reduce the computational complexity required to train a deep convolutional neural network. In other embodiments, other CNN architectures may be used.

Initialized weights learned from training on the ImageNet data set were used. The 1024 feature maps learned by the network were fed through a global average pooling layer, which is a method to effectively reduce the trainable parameters during classification to avoid overfitting. The output from this layer is fed through a 128 dense layer before the final classification layer. The network was trained with the Adam optimizer, and a dropout of 50% was applied to the 128-node fully connected layer.

Standard data augmentation of flips, shear, rotation, and translation were used. Flips were performed with 50% likelihood, shear was applied between −15 and 15 degrees, rotation was applied between −45 and 45 degrees, and translation was applied between −15% and 15% of the size of the image in both the x and y directions. These augmentations are used because it is expected that, because the orientation of a blood vessel is irrelevant to its classification, these types of affine translations would generate images that would still be considered valid blood vessels and diagnosable by a physician. The shear transformation is used because it is a method of simulating a blood vessel taken in an out-of-plane cross-section, providing more diversity in the training set. To account for the class imbalance in this stage of training, the data augmentation pipeline is weighted so that the underrepresented diseased class receives more augmentations during each batch.

Aggregation

After obtaining localized blood vessels and diseased classifications for each blood vessel in a WSI, the next step is to aggregate these predictions to obtain a single vector of data for classification of disease at the image level. This classification can be used to alert the physician about which images would benefit from more in-depth pathologic inspection.

The latent space vectors from the classification stage are aggregated, as shown in FIG. 1(C), and concatenated with metadata. In the case of the exemplary application, the metadata comprises patient delivery data, as shown in Table 1 below. The patient-level data are classified with a random decision forest model, which outputs a diseased/healthy classification for the WSI.

TABLE 1

Description of Patient Metadata Features Used in Exemplary Application

| Feature | Description |
| --- | --- |
| Hypertensive Disorder of Pregnancy | Including preeclampsia, eclampsia and HELLP (hemolysis, elevated liver enzymes, and low platelet count) syndrome |
| Placental Weight | Placental weight at delivery, in grams |
| Diabetes | Maternal diabetes status |
| Lupus | Maternal lupus status |
| Infant Growth | Infant growth using Alexander Growth Chart: 0 for average or large birth, 1 for small birth weight for gestational age |
| Preterm Birth | Preterm delivery, defined as <37 weeks gestation |

To maximize classification accuracy at this stage, it is desirable to incorporate information from many regions of the image rather than relying on image features detected from a single blood vessel. That is, it is expected that a more holistic representation of classified disease in the image will result in a better global-scale classification accuracy.

Figure 4:
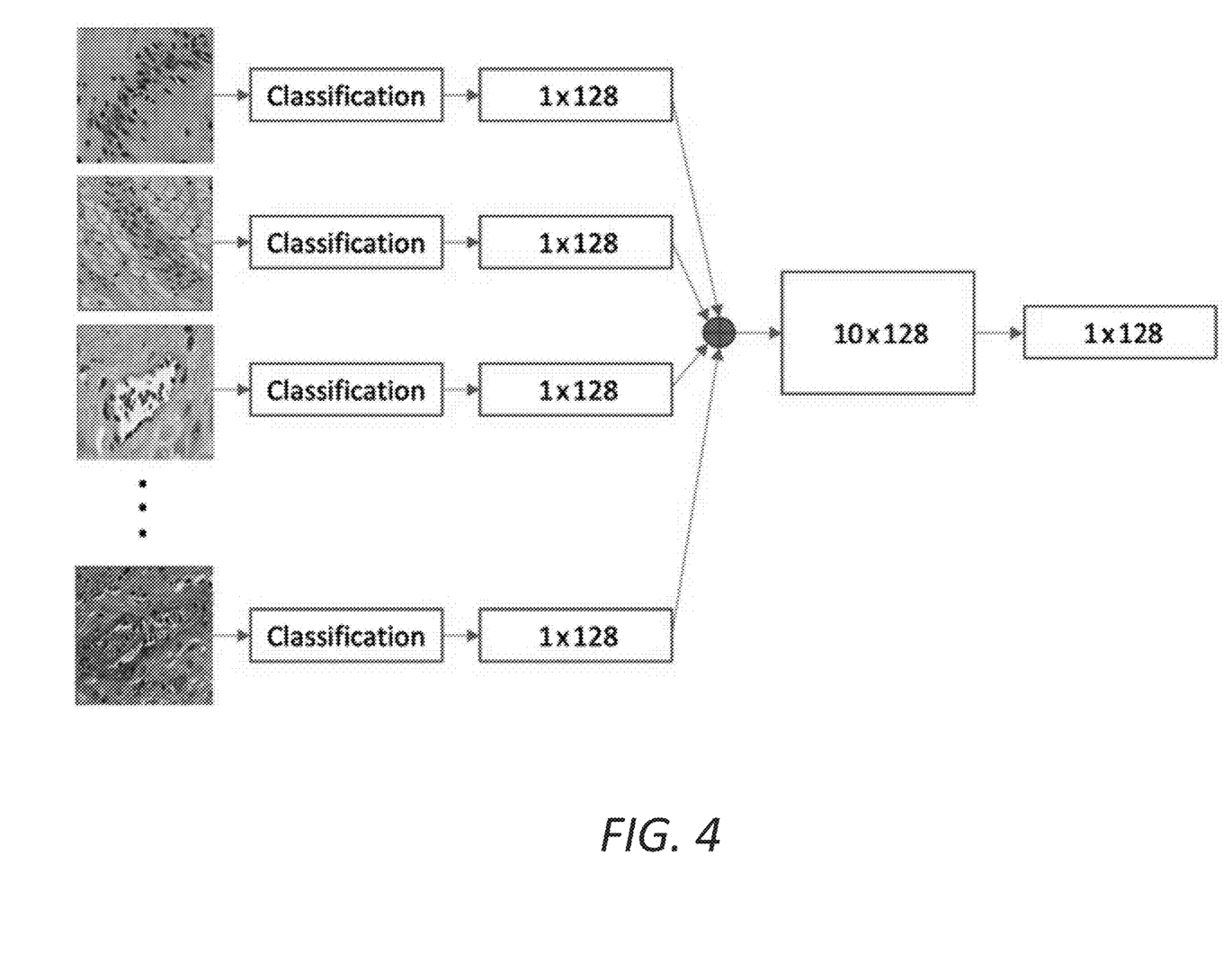
FIG. 4 is a schematic representation of the method for aggregating latent feature representations from numerous blood vessels in one image.

However, each WSI has a different number of blood vessels, and any number of these vessels can have or not have disease. From the previous stages of the hierarchical deep-learning framework, each blood vessel has been identified and classified through a deep learning network. The method for aggregating these is shown in FIG. 4. First, all detected blood vessels are evaluated with the classification algorithm. Then, the 128-node latent spaces from the top 10 predicted diseased blood vessels are concatenated into a single 10×128 matrix. Finally, a pooling operation is performed on each column of the matrix, where either the maximum or minimum value was taken, depending on if that node was maximized or minimized by the diseased image set during training.

This stage aggregates latent feature representations from numerous blood vessels in one image. After classification in the previous stage, the latent feature representation of each classified blood vessel is 128 nodes in length. The blood vessels are sorted in a list based on the classification network's output confidence, from most to least diseased (note that even healthy blood vessels can be ranked in terms of diseased confidence). The confidence is considered to be proportional to the deviation from 0.5 of the scalar classification output, with a diseased classification of 1.0 being maximally confident.

Next, the latent vectors are stacked into one matrix of shape N×128, where N is the number of analyzed blood vessels included in the analysis. In preferred embodiments, the top 10 ranked blood vessels (e.g., the 10 blood vessels with the most confident disease classification output from the classification state) are used for the analysis. This number is chosen to minimize the potential negative impact of having a large number of healthy blood vessels in the downstream analysis, because most diseased images in the training set had ≤10 diseased blood vessels. The latent spaces are aggregated instead of the individual blood vessel classifications so that the full framework has the opportunity to make decisions from the more holistic feature sets learned during training, such as morphologic patterns across blood vessels, and not solely from the scalar classifications.

After this aggregation, the data are pooled by calculating either the maximum or the minimum of the data for each node of the feature map. This is determined for each node based on if that node was being maximized or minimized by the diseased image class during training. As expected for a well-balanced classifier, about half of the nodes were being maximized and half were being minimized during training.

Once the aggregated latent vector, of size 1×128 in preferred embodiments, has been generated for each image in the training set, principal component analysis is performed to reduce the dimensionality to 1×5. Principal component analysis is an unsupervised transformation method that linearly maps data to a lower dimensional space while maximizing the amount of variance explained in the original data. This transformation is used to reduce the number of dimensions of the training data, to reduce the risk of overfitting on a small data set, while still keeping as much of the variance in the data as possible.

After dimensionality reduction, the pooled latent representation is concatenated with a vector of patient metadata describing the mother's health and outcome of the delivery. The metadata features used in this work are described in Table 1. The combined vector of latent and metadata features is shifted such that the mean is centered at zero, then is scaled by the standard deviation. The resulting data are used, in the preferred embodiment, to train a random decision forest classifier to perform a binary classification between diseased and healthy slides.

A random decision forest is a method of ensemble learning in which a large number of shallow decision trees are constructed to provide an output that is the mode of the predictions from each tree. This type of model was selected for its robustness to overfitting, particularly on small data sets. A diseased slide is defined as one with at least one example of a diseased blood vessel, which is considered a clinically relevant indication of potential hypoxia-related disease. At this stage of the framework, each whole slide image, as opposed to each blood vessel patch, is considered to be one data sample, which drastically lowers to available training data compared with the previous stages of the framework. To help avoid overfitting, a fivefold cross validation is used to select the best model parameters for the training set, which are then applied to the test set.

Clinicopathologic and Image Data Sets

A total of 181 archival placenta cases (obtained between 2008 and 2012 from UPMC Magee-Womens Hospital in Pittsburgh, Pa.) were used in the proof of concept for this invention. Glass slides with hematoxylin and eosin stained tissue sections, cut at 4 to 5 mm thickness, were scanned on a whole slide scanner at 20× magnification, to produce digital slides with a resolution of 0.50 mm/pixel, using bright-field microscopy.

Cases that were selected for review were analyzed by a blinded perinatal pathologist. There were 46 cases (25%) with confirmed DV. DV lesions are characterized by abnormalities of decidual arterioles that may include a combination of fibrinoid necrosis of vessel walls, hypertrophy of the media, subendothelial lipid-laden macrophages, and possible thrombi within the lumen. Each slide contained many normal (non-lesional) microscopic blood vessels (approximately 30 per slide), whereas in the cases with DV, an average of five of these blood vessels per slide displayed signs of DV.

The images were matched to clinical data through the Magee Obstetric Maternal and Infant database. The clinical data features used, along with the images in this study are those shown in Table 1. Samples for histologic evaluation were taken from several regions of the placenta, including the umbilical cord, the placental disc, and the fetal membranes. For this study, digital images of the membranes from which a strip is taken rolled up tightly and cross-sectioned were analyzed. An example of the membrane roll is shown in FIG. 3(A). The membrane roll provides opportunity to examine a large cross-sectional area of the decidual region of the placenta, which contains the distal portion of decidual spiral arterioles and is the region where DV lesions are most likely to be found.

The images were reviewed by two pathologists who labeled 710 instances of DV that were used as the primary labels for training. These labels were curated with the VGG Image Annotator. In addition, healthy regions of the image were annotated to identify blood vessels in WSIs. A total of 6,095 annotations were provided for training. Because the hierarchical deep learning framework of the present invention was initially trained to identify diseased blood vessels, variance in the labels of the healthy class should not have affected the performance metrics of the algorithm, which was compared with the ground truth labels from physicians.

Results

Object Detection—The entire slide data set of 181 slides (46 with identified DV, 135 without) was split into a set of 11,610 low resolution patches for the blood vessel detection step. For this set, 7281 patches were used for training, 1805 were used for validation, and 2524 were used for testing. Because the number of DV annotations is small compared with the total number of blood vessel annotations, and to prevent overfitting, this stage of the network treats blood vessels as a single class and does not make a classification, instead only outputting bounding boxes for any predicted blood vessels, as shown in FIG. 2.

The purpose of this stage of the framework is to narrow down the number of regions that need to be analyzed in higher resolution as much as possible, without missing regions of DV in the WSI. To this end, one feature of the presented algorithm is that the discriminative threshold can be tuned to be more lenient such as to find a higher percentage of diseased blood vessels, at the expense of making more predictions on incorrect regions as well. The results of sweeping through many of the thresholds are shown in Table 2 below. Although this stage of the network was trained to detect blood vessels without differentiating between healthy and diseased classes, the primary metrics that are considered important for this research are the network's ability to capture the disease cases, because the purpose of the framework is to identify DV within the digital slide.

TABLE 2

Results of Blood Vessel Object Detection Trade-Off

| Total Predictions made on 2524 test patches | Overall Precision | Diseased Class Recall |
| --- | --- | --- |
| 28,834 | 0.08 | 0.95 |
| 16,663 | 0.13 | 0.94 |
| 12,400 | 0.22 | 0.92 |
| 6,574 | 0.45 | 0.9 |
| 5,028 | 0.59 | 0.86 |
| 4,228 | 0.69 | 0.8 |
| 3,660 | 0.77 | 0.77 |

Using a lenient cutoff value (such as the 28,834 predictions), the recall of the diseased class (the number of diseased vessels captured in the predictions divided by the total number of diseased vessels) is high, whereas the total class precision (the number of total annotations captured in the predictions divided by the total number of predictions made) is low. However, using a stricter cutoff value (such as the 3660 predictions) results in fewer overall predictions, raising the total class prediction while lowering the diseased recall.

Classification—At this stage in the framework, patches are taken at high resolution around each annotated blood vessel. Of the 6,095 total annotated blood vessels, 3,765 (3,313 healthy and 452 diseased) were used for training, 989 (879 healthy and 110 diseased) were used for validation, and 1,341 (1,193 healthy and 148 diseased) were used for testing. These images were augmented throughout training, which is described in detail above. The algorithm was trained for 40 epochs (cycles through full training set), and the trained model with the highest validation accuracy was selected for testing.

The overall performance metrics for the blood vessel classification stage of the framework is shown in Table 3.

TABLE 3

Performance Metrics for Blood Vessel Patch Classification

| Variable | Validation, % | Test, % |
| --- | --- | --- |
| Sensitivity | 95 | 94 |
| Specificity | 96 | 96 |
| Accuracy | 96 | 96 |

For the test set, a sensitivity (true positives divided by total positives) of 94% and a specificity (true negatives divided by total negatives) of 96% was achieved. A slightly higher weighting toward the negative classification rate in both the validation and test set is observed, which may be due to the large class imbalance between the diseased and healthy sets. The confusion matrix for the results on the test set (positive predictive value equals 0.74, and negative predictive value equals 0.99) is shown in FIG. 5(A), demonstrating the specific results for each class.

To demonstrate the expected trade-off between the true- and false-positive rates from the binary classification, a receiver operating characteristic curve was generated for the results on the test data. This curve is made by sweeping through every possible discriminative threshold value of a binary classifier and plotting the corresponding true-positive and false-positive rate for each point. The area under the curve is a commonly reported metric in binary classification and is interpreted as the probability that a classifier will rank a randomly chosen positive sample higher than a randomly chosen negative sample.

Figure 5:
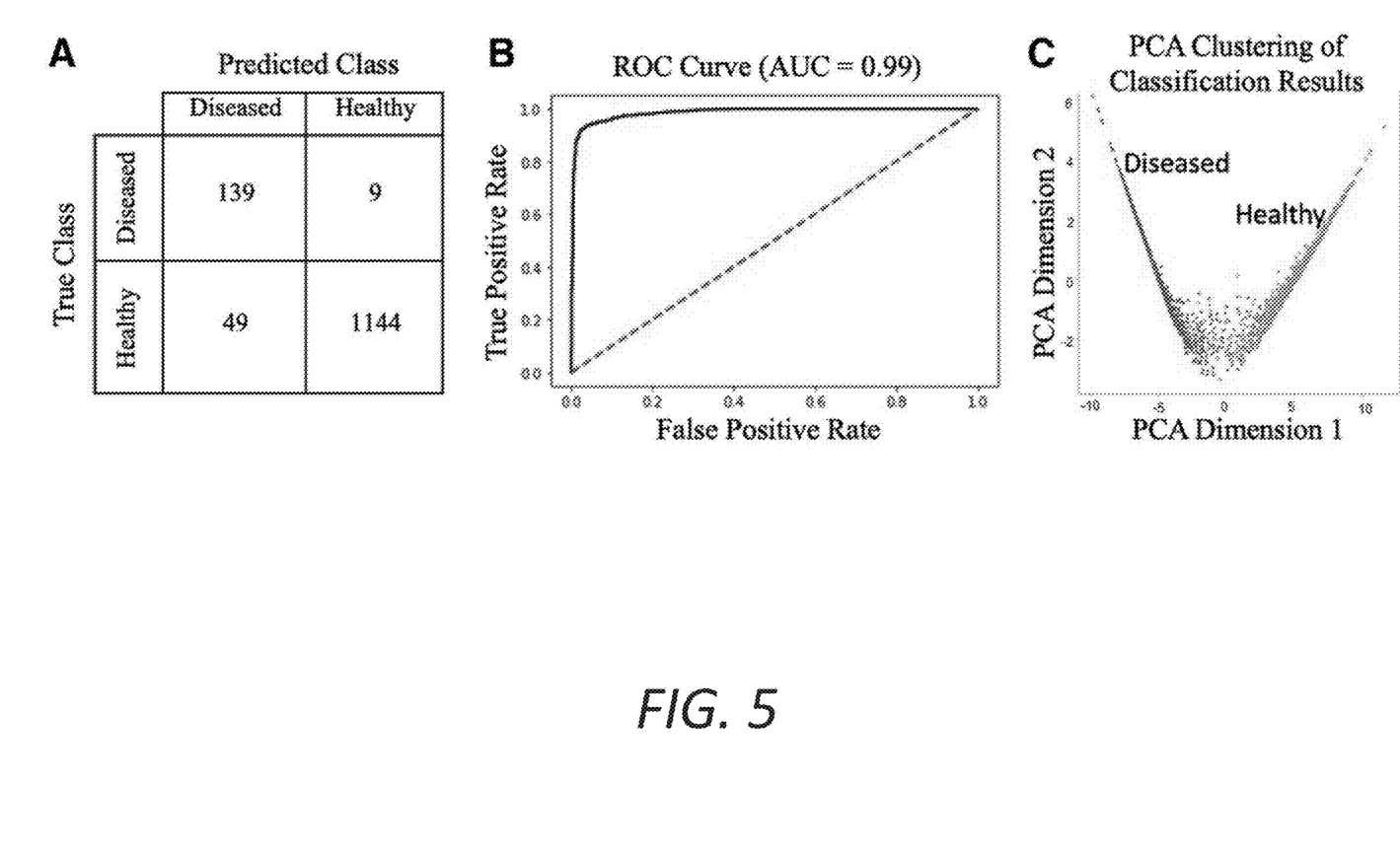
FIG. 5 are diagrams showing the blood vessel classification results using the hierarchical deep-learning framework of the present invention.

FIG. 5(B) shows a receiver operating characteristic (ROC) curve of blood vessel classification results on the test data set, illustrating the achievable trade-off between true and false positive rates as a discriminative threshold of the classifier is varied. The dashed line shows a comparison to a random classifier. A receiver operating characteristic curve with an area under the curve equal to 1 is considered a perfect classifier. The area under the curve for the blood vessel classification task applied to the test set was 0.99.

FIG. 5(C) shows results of a two-dimensional principal component analysis (PCA) on the 128-node latent space of classified blood vessel patches from the test set, mapping the data to the two orthogonal dimensions corresponding to the highest variance in the training set. This provides a visualization of the separation of the class populations into clusters being formed by the classification algorithm and provides a measure of validation that a useful latent representation has been learned. Dark points indicate diseased blood vessels and light points indicate healthy placenta vessels. Two visible distributions emerge between the healthy and diseased classes.

Results from Combined Object Detection and Classification Framework

Both the classification and the object detection phases of the hierarchical deep learning framework were trained separately from one another during the training phase. However, to get a more accurate estimate for the performance of the entire framework in a clinical setting, the held-out test slides were run through the entire framework, with the predictions made from one phase being used as the inputs for the next phase. To ensure unbiased assessment, no model parameters at any stage of the framework were influenced by any data from these held-out test slides. For labeling purposes, any output from the object detection algorithm that had an intersection over union of >0.15 with a diseased blood vessel was given a diseased label, and all other predictions were given a healthy label.

This intersection over union was chosen because, with a margin of padding being added around each object before being analyzed with the classification algorithm, it was expected to cover a sufficient area of diseased tissue for a classification to be made, a claim that has been validated qualitatively through shadowing sessions with a pathologist.

Similar to the results of the object detection stage of the framework, the discriminative threshold can be tuned to be either more strict, and make fewer incorrect predictions at the expense of finding fewer of the diseased blood vessels, or more lenient, and make more incorrect predictions while also finding a higher percentage of the total number of diseased blood vessels.

The main two performance metrics for comparison of these results are the overall diseased recall, which is the fraction of total diseased blood vessels that were located and correctly classified by the framework, and the overall diseased precision, which is the fraction of disease predictions that were actually diseased blood vessels.

Whole Slide Classification Through Aggregated Latent Space Analysis

To obtain a single whole slide classification of disease, the latent space features from the blood vessel classifications are sorted, aggregated, and pooled for each patient, using a pooling technique described above. This results in a vector of 1×128, on which dimensionality reduction via principal component analysis is performed.

FIG. 6(A) is a graph showing variance explained by principal components, used to illustrate the trade-off between the number of principal components used, and the ratio of explained variance (or the ratio of the cumulative sum of the eigenvalues) in the blood vessel latent space analysis. The learned principal components were fit to the training set and applied to both the training set and the test set. Five principal components were selected to be used for the final analysis, as higher numbers of principal components begin to display evidence of overfitting between the training set in the test set The obtainable explained variance ratio between using 1 and 50 principal components (eigenvectors) that were fit to the training data set, applied to both the training set and the test set. The explained variance ratio for N principal components is equal to the sum of the N largest eigenvalues of the covariance matrix of the data, divided by the total sum of all eigenvalues. The first several principal components increase the explained variance significantly, and it starts leveling off at a higher number of principal components.

The resulting feature set is concatenated with patient metadata features and used as the input data to train a random decision forest classification algorithm, which is a method of ensembling numerous shallow decision trees to prevent overfitting. A hyperparameter grid search was performed to scan through a set of potential algorithm parameters, in which the following parameters were explored: number of estimators, maximum depth per tree, and maximum features to consider at each split. Feature splits were selected using the maximum information gain criterion.

Figure 6:
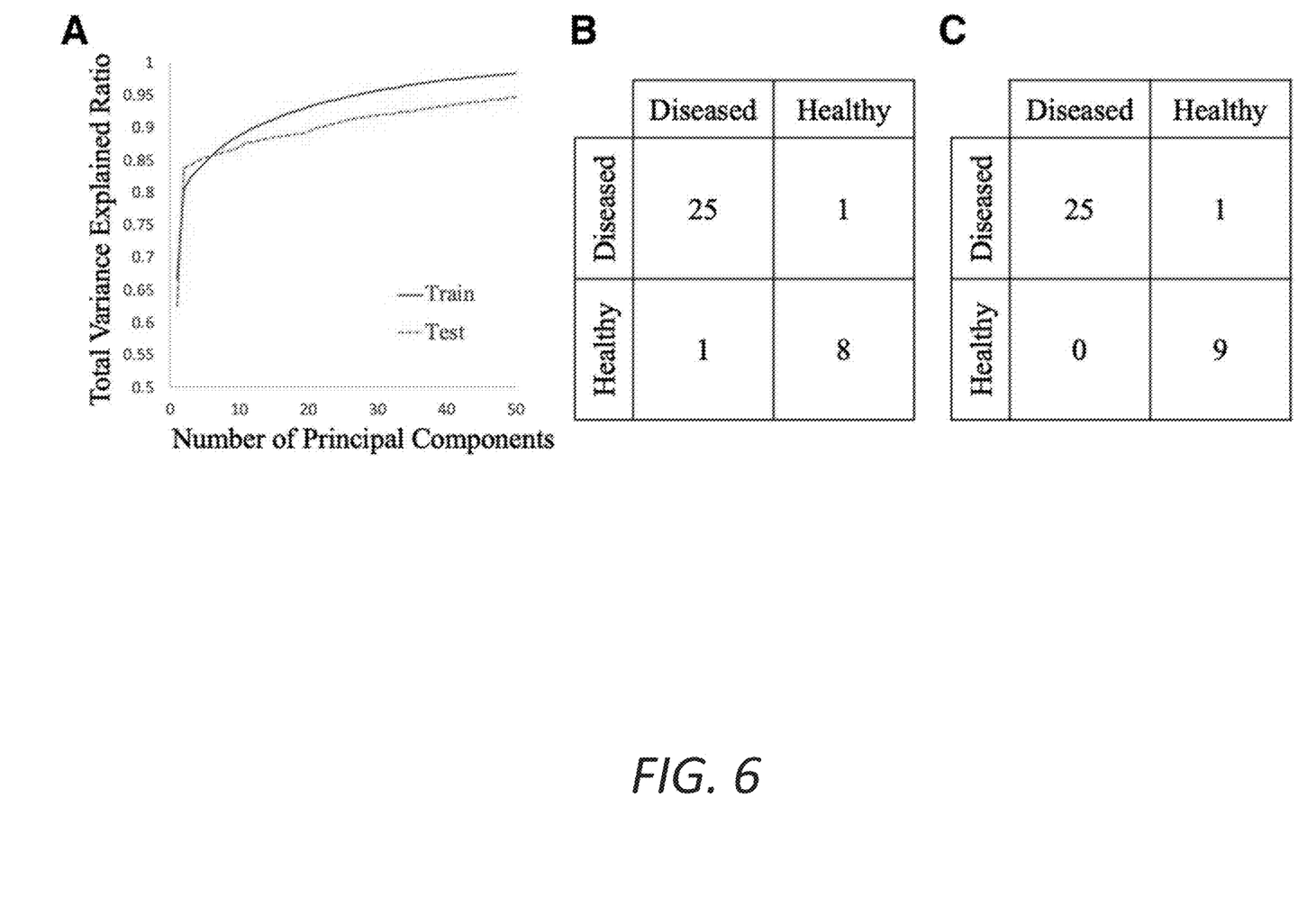
FIG. 6 are diagrams showing results from the combined object detection plus classification analysis using the hierarchical deep-learning framework of the present invention.

A five-fold cross validation was performed for each parameter combination in the grid search, and the parameters with the best average performance across all five folds in the cross validation were selected to be used for testing the model performance. The final chosen parameters were as follows: number of estimators, 50; maximum depth, 2; and maximum features, 3. For testing, all five folds were combined and used to train a random decision forest algorithm with the selected parameters, which was applied to the held-out test set. The confusion matrices of these results are shown in FIGS. 6(B) and 6(C). FIG. 6(B) is a confusion matrix showing global disease classification results on the test set, using latent features only. FIG. 6 (C) is a confusion matrix showing global disease classification results using latent features and patient metadata.

In summary, the proposed ML framework introduces a hierarchical method to analyze histologic digital images, for the purpose of automating placental DV lesion inspection. Results from this data set show the algorithm's ability to discriminate key features and candidate locations within a high-resolution WSI while keeping false positives minimized.

This type of artificial intelligence approach allows many more placentas to be screened with fewer pathologists, increasing DV detection for mothers who are at risk for preeclampsia in subsequent pregnancies. When this risk of preeclampsia is identified earlier, it allows for preventative treatment. This can accordingly reduce health care expenses and reduce both mother and neonatal morbidity, particularly in the developing world where perinatal pathologist expertise may not be available.

The described invention, as mentioned above, can be generalized to different applications. The generalization of the hierarchical deep learning framework is explained below in the context of an application to detect objects in high-pixel count satellite images. The problem presented by these images parallels the problems discussed above for detecting blood vessels in high pixel count placental images, that is, the pixels comprising the object to be detected is very small when compared to the total number of pixels in the image.

Figure 7:
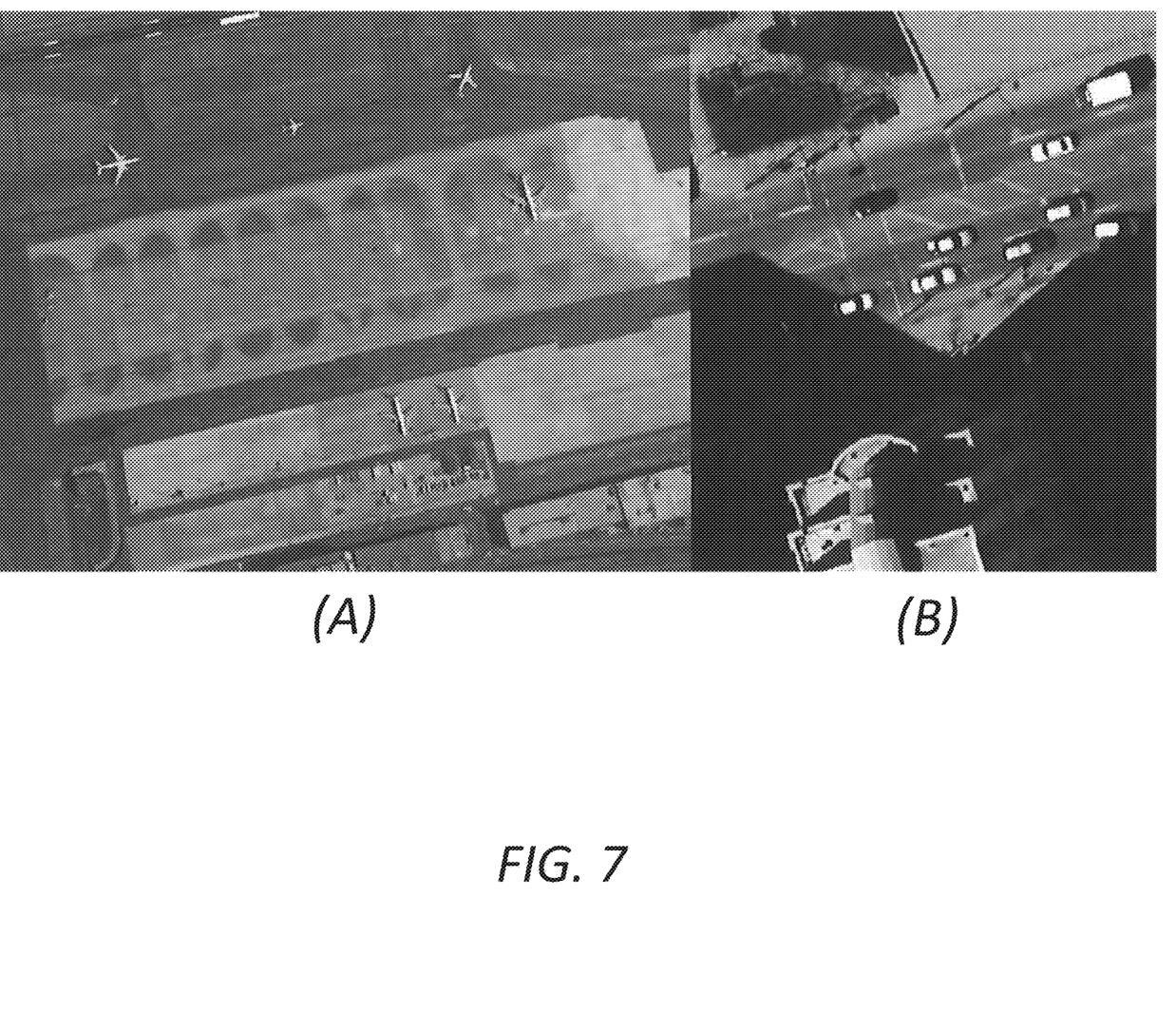
FIG. 7 are examples of satellite imagery from the NPWU VHR-10 dataset, showing various objects of interest.

The dataset used for the generalization of the hierarchical deep learning framework is the Northwestern Polytechnical University Very High-Resolution 10-class (NWPU VHR-10) dataset, which contains 650 annotated images containing 3896 annotations of objects within satellite imagery. This dataset was chosen because the objects in the dataset are very small compared to the overall size of the images, as can be seen in FIG. 7, showing aircraft in FIG. 7(A) and cars in FIG. 7(B) both of which have relatively small pixel counts, making it difficult for a machine learning algorithm to distinguish these objects unless viewed at full resolution. There are 10 different object types identified in the image dataset, including (with counts): ships (302), vehicles (477), bridges (124), harbors (224), ground track fields (163), baseball diamonds (390), tennis courts (524), basketball courts (159), storage tanks (655) and aircraft (757).

The image dimensions in the dataset range between 533×597 and 728×1028 pixels. This dataset was split in a stratified manner into approximately 60% training images, 10% validation images, and 30% test images, consisting of 2280 train annotations, 326 validation annotations and 1290 test annotations which were used for training both CNNs in the ML framework. The breakdown of these annotations by class is shown in Table 4 below.

Deep Learning Framework

As discussed above with respect to the placental image application, the deep learning framework is based on two separately trained CNNs. The first CNN analyzes the images in a lower resolution for the purpose of detecting potential regions of interest, and the second CNN performs a high-resolution classification of each detected region. The final aggregation step discussed above was not implemented with the satellite images because, unlike the placental image application, this problem is a multi-class classification in which equal importance is assumed for all classes, and, as such, a single global classification would not be desirable in this case.

Because the hierarchical deep learning framework for this task was nearly the same as the framework introduced above, the description of this application is focused on the details about how the satellite imaging framework differs from the one discussed above with respect to the placental image application.

TABLE 4

Overview of classes and the training/validation/test split

| Class | Training Annotations | Validation Annotations | Test Annotations |
|---|---|---|---|
| Aircraft | 430 | 75 | 252 |
| Ship | 203 | 18 | 81 |
| Storage Tank | 354 | 57 | 244 |
| Baseball Diamond | 251 | 39 | 100 |
| Tennis Court | 335 | 33 | 156 |
| Basketball Court | 96 | 15 | 48 |
| Ground Track Field | 96 | 17 | 50 |
| Harbor | 153 | 20 | 51 |
| Bridge | 79 | 15 | 278 |
| Vehicle | 162 | 37 | 278 |
| Total | 162 | 37 | 278 |

One difference in the framework for the satellite imagery application is the method of data augmentation during training. For both the object detection and classification CNNs, the pathology-specific stain transformations were removed, as well as the shear augmentation that had been used for the blood vessel classification. Thus, the augmentations consisted of random flips, rotations, and translations in space. As in the placental image application, the classes are balanced by performing more augmentations on the under-represented classes. Additionally, because these images were much smaller than the placental images, the method of patch extraction for the object detection stage was not performed, and instead each image was simply down-sampled to a lower resolution of size 512×512 pixels. Then, each extracted patch was analyzed at the full original resolution for the classification stage.

The object detection framework was trained for 50 epochs with a batch size of 1, with an initial learned rate of $1\times10^{-5}$, which was scheduled to lower by 10 times after 10 consecutive epochs without a decrease in validation loss. Additionally, the classification framework was trained for 40 epochs, with a batch size of 20, and a learning rate of $1\times10^{-6}$. The model with the lowest validation categorical cross-entropy loss was selected for testing.

Object Detection Results

Figure 8:
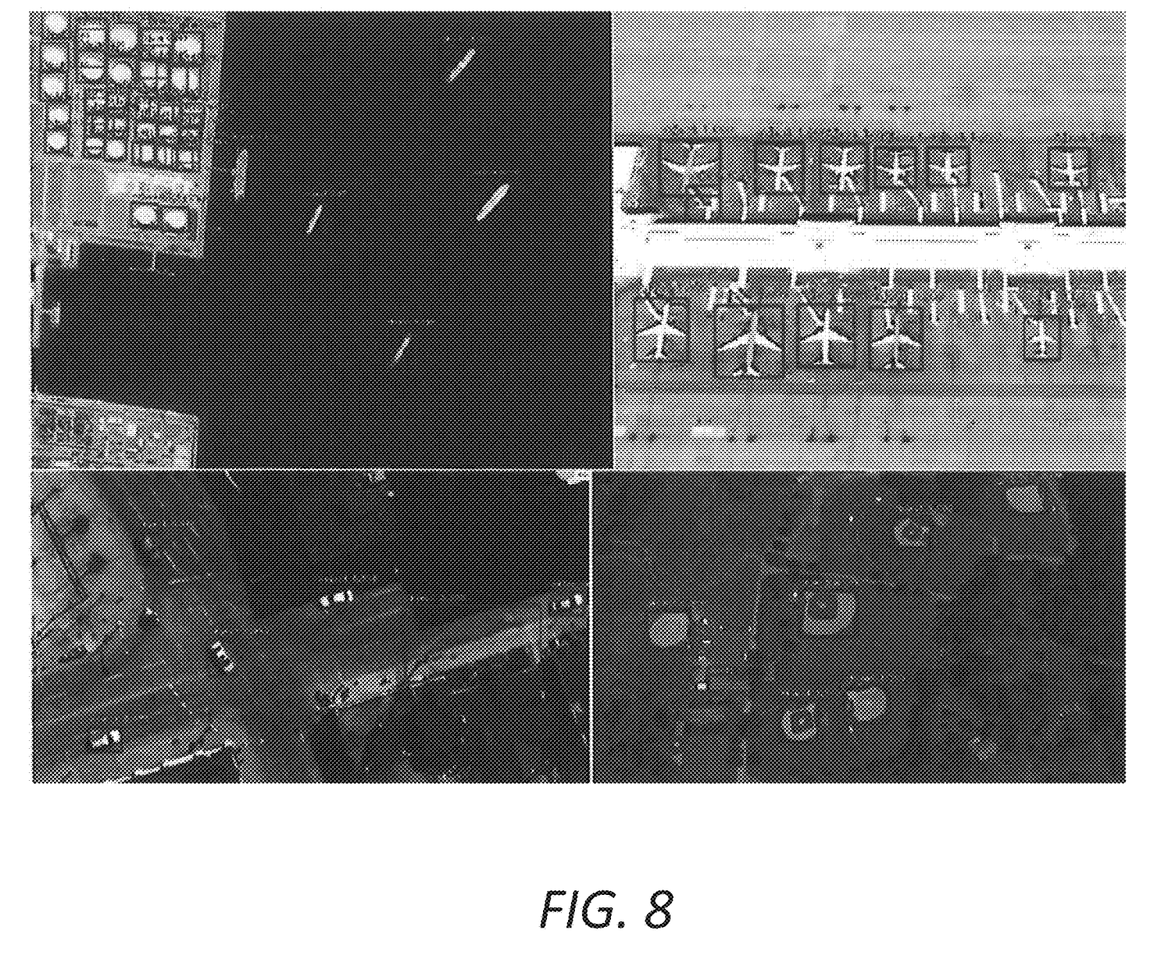
FIG. 8 are examples of satellite imagery showing example predictions, shown as dark boxes, from the object detection stage of the hierarchical deep-learning framework, applied to images from the test set showing boats and storage tanks (top left), airplanes (top right), vehicles (bottom left), and baseball diamonds (bottom right).

The object detection stage was trained to analyze images at a lower resolution (each image is down-sampled to 512×512 pixels) and to provide an output of bounding box locations for regions of interest within the image, without distinguishing between classes. This is done to reduce the number of regions that will be analyzed at a higher resolution in an effort to minimize false positives and boost classification rates. Table 5 shows the results of this analysis applied to the test set, demonstrating the tradeoff between precision and recall as the confidence threshold of the network is varied. The threshold cutoff that provided the most balanced results was a value of 0.5, where the model obtained an average precision of 94% and an average recall of 93%. FIG. 8 shows several images of detection results on the test set. As can be seen, some of the objects, such as vehicles, are very small compared to other objects in the dataset, such as baseball diamonds. Additionally, the model detected objects in many orientations, such as the cars and boats displayed in the figure.

TABLE 5

Object Detection Without Distinguishing Between Classes

| Confidence Threshold | Average Precision | Average Recall |
|---|---|---|
| 0.2 | 82% | 97% |
| 0.3 | 89% | 95% |
| 0.4 | 92% | 94% |
| 0.5 | 94% | 94% |
| 0.6 | 96% | 91% |

Classification Results

Figure 9:
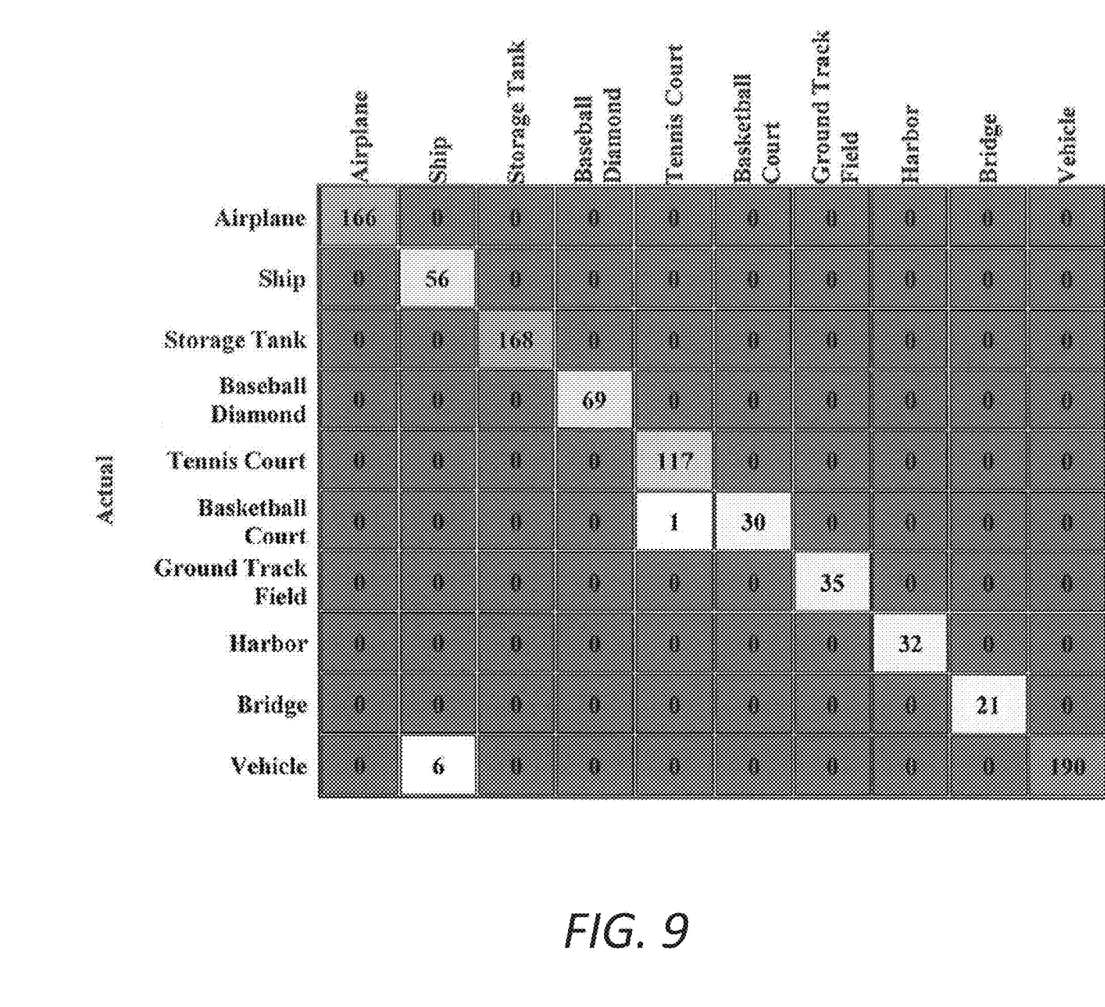
FIG. 9 is a confusion matrix for classification results on a test set, analyzing object patches taken from the NPWU VHR-10 dataset.

To train the classification CNN, image patches centered around each annotation in the training dataset were selected from the high-resolution images. The Inception V4 CNN architecture was used (although other architectures could have been used as well), which used the basic Inception architecture along with some residual functions, as this model was found to have the best performance on the validation set. The model was initialized with weights learned from the ImageNet dataset. As can be seen in the confusion matrix in FIG. 9, the model demonstrated excellent performance on the test set, with an average accuracy of 99%. This is due in part to the use of the initialization from ImageNet, with which the model had been trained with millions of images to recognize many of the same classes that exist in the NWPU VHR-10 dataset as well. Because this stage of the deep learning framework classifies local image patches of the objects of interest, it has a very similar task to that of a more typical ImageNet classification algorithm, and this similarity in training procedures can significantly help the results of the transfer learning being performed.

Combined Analysis

Figure 10:
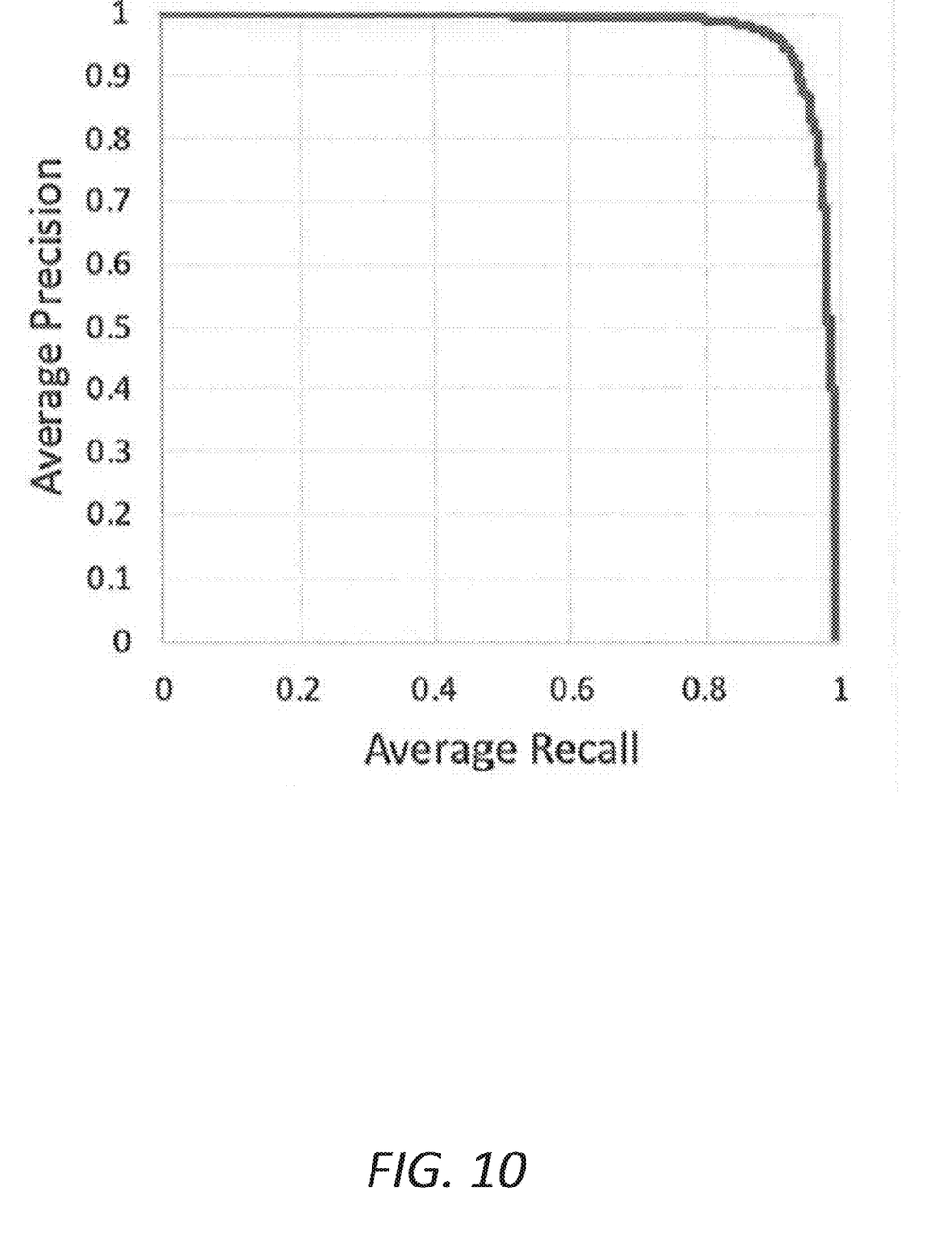
FIG. 10 is a precision-recall curve for combined analysis of object detection/classification on the NWP VHR-10 dataset.

To validate the performance of the model, the combined framework, including object detection and classification, was applied to the test set. In this stage, the outputs from the object detection stage were used as the inputs into the classification stage. For this test, a common metric used to represent the performance of an object detection algorithm is the average precision (AP). This is found by calculating the area under the precision-recall curve in the range of recall=0 to recall=1, with a higher AP signifying better performance. The mean average precision (mAP) is the average AP values over all classes and is commonly cited when comparing object detection algorithms. The average precision-recall curve for the combined analysis is shown in FIG. 10. The mAP obtained for this analysis was 0.9136, which demonstrates the algorithm's ability to both detect objects of interest as well as minimize false classifications. As shown in the figure, at a confidence threshold of 0.6, the algorithm achieves 94% average precision and 93% average recall among all classes.

The hierarchical image analysis framework which was presented above with respect to the placental imagery application has been applied to a problem from a separate domain, that of satellite image recognition. Achieving excellent results on the combined framework of object recognition and classification provides validation that the hierarchical deep-learning framework presented and the present invention is effective at detecting regions of interest within very high resolution and complex imaging datasets, as well as evidence that the proposed deep learning framework is generalizable to many types of image recognition problems.

As would be realized by one of skill in the art, the use of the invention for placental image analysis is provided as an exemplary application to explain the invention and is not meant to limit the invention in any way. Similarly, specific neural network architectures and parameters used in the implementation of the neural networks discussed herein are provided solely as an aid to explain the invention and are not meant to limit the scope of the invention in any way. The scope of the invention is specified by the claims which follow.

The invention claimed is:

1. A method comprising:
obtaining an image;
analyzing the image, using a trained machine learning model to identify one or more objects of interest in the image, the analysis occurring at a lower resolution than the native resolution of the image;
classifying the identified objects of interest at a higher resolution using a trained machine learning classifier, wherein the machine learning classifier outputs a latent vector for each classified object;
aggregating the latent vectors for a predetermined number of classified objects;
pooling the aggregated latent vectors by calculating a maximum or minimum of the data for each node of a feature map of the machine learning classifier;
performing principal component analysis on the pooled aggregated latent vectors to produce a reduced dimension latent vector;
concatenating the reduced dimension latent vector with a vector representing metadata related to the image; and
performing a binary classification for each image.

2. The method of claim 1 wherein the machine learning model places bounding boxes around the identified objects of interest.

3. The method of claim 2 wherein the machine learning model outputs, with each identified object, a probability that the identified object is an object of interest.

4. The method of claim 1, further comprising:
separating the image into a plurality of smaller image patches;
wherein analyzing the image comprises analyzing each of the plurality of smaller image patches separately.

5. The method of claim 1 wherein the binary classification is performed using a random decision forest.

6. The method of claim 1:
wherein the image is a high-resolution whole slide image of organic tissue; and
wherein the objects of interest are structures within the organic tissue.

7. A method comprising:
obtaining an image;
separating the image into a plurality of image patches;
analyzing each image patch at a lower resolution than the native resolution of the image using a trained machine learning model, to identify one or more objects of interest in the image patch;
classifying each identified object of interest in the image patch at a higher resolution, using a trained machine learning classifier;
aggregating latent vectors produced by the machine learning classifier for a predetermined number of classified objects of interest;
pooling the aggregated latent vectors by calculating a maximum or minimum for each node of a feature map of the machine learning classifier; and
performing principal component analysis on the pooled aggregated latent vectors to produce a reduced dimension latent vector.

8. The method of claim 7 further comprising:
concatenating the reduced dimension latent vector with a vector representing metadata related to the image; and
performing a binary classification for the image.

9. The method of claim 8 wherein the binary classification is performed using a random decision forest.

10. The method of claim 7 wherein the trained machine learning model uses a ResNet feature extractor.

11. The method of claim 7 wherein trained machine learning model places a bounding box around each identified object of interest.

12. A system comprising:
an object detection framework trained to detect objects of interest at a lower resolution within a high-resolution image;
a classification framework trained to analyze a high-resolution image of each detected object of interest to classify the object of interest; and
an aggregation framework for aggregating a predetermined number of latent space vectors produced by the classification framework with metadata relating to the high-resolution image to determine a binary classification for the high-resolution image.

13. The system of claim 12 wherein the high-resolution image is broken into a plurality of image patches and wherein the object detection framework analyzes each image patch separately to detect objects of interest within the image patch.

14. The system of claim 12 wherein the object detection framework uses a neural network trained to detect the objects of interest within the high-resolution image.

15. The system of claim 12 wherein the classification framework uses a neural network trained to classify objects of interest identified by the object detection framework.

16. The system of claim 12:
wherein the high-resolution image is a whole slide image of organic tissue; and
wherein the objects of interest are structures within the organic tissue.

17. The system of claim 12, further comprising:
normalizing each high-resolution image of detected objects of interest before submitting the high-resolution images to the classification framework.

* * * * *